(12) United States Patent
Buck et al.

(10) Patent No.: US 11,927,175 B2
(45) Date of Patent: Mar. 12, 2024

(54) ROTOR BLADE WITH NOISE REDUCTION

(71) Applicant: Siemens Gamesa Renewable Energy A/S, Brande (DK)

(72) Inventors: Steven Buck, Boulder, CO (US); Stefan Oerlemans, Herning (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 31 days.

(21) Appl. No.: 17/765,868

(22) PCT Filed: Sep. 25, 2020

(86) PCT No.: PCT/EP2020/076991
§ 371 (c)(1),
(2) Date: Apr. 1, 2022

(87) PCT Pub. No.: WO2021/078471
PCT Pub. Date: Apr. 29, 2021

(65) Prior Publication Data
US 2022/0349380 A1  Nov. 3, 2022

(30) Foreign Application Priority Data
Oct. 23, 2019 (EP) .................................. 19204871

(51) Int. Cl.
*F03D 7/02*  (2006.01)
*G10K 11/178*  (2006.01)

(52) U.S. Cl.
CPC ...... *F03D 7/0296* (2013.01); *G10K 11/17857* (2018.01); *F05B 2260/962* (2013.01); *G10K 2210/121* (2013.01)

(58) Field of Classification Search
CPC .............. F01M 11/12; F01M 2250/64; F01M 2250/66; Y02T 10/12; F02D 41/22;
(Continued)

(56) References Cited

U.S. PATENT DOCUMENTS

| 2009/0097976 A1* | 4/2009 | Driver .................... F03D 7/022 416/61 |
| 2013/0164135 A1 | 6/2013 | Himmelmann |
| 2014/0142888 A1 | 5/2014 | Duncan et al. |

FOREIGN PATENT DOCUMENTS

| EP | 3249216 A1 | 11/2017 | |
| ES | 2327696 A1 * | 11/2009 | ............. F03D 80/00 |

(Continued)

OTHER PUBLICATIONS

PCT International Search Report and Written Opinion of International Searching Authority dated Jan. 18, 2021 corresponding to PCT International Application No. PCT/EP2020/076991 filed Sep. 25, 2020.

*Primary Examiner* — Jacob M Amick
*Assistant Examiner* — Charles J Brauch
(74) *Attorney, Agent, or Firm* — Schmeiser, Olsen & Watts, LLP (57) ABSTRACT

A rotor blade with a leading edge and a trailing edge is provided, wherein the rotor blade is for being exposed to a fluid flowing substantially from the leading edge to the trailing edge, the rotor blade includes at least three sensors designed for detecting flow characteristics of the fluid and providing respective sensor signals, wherein the sensors are arranged with a non-uniform spacing, and the rotor blade further includes at least one actuator for producing an anti-noise signal based on a sensor signal, the sensors and the actuator are arranged at the surface of the rotor blade, and the actuator is arranged and prepared such that flow-induced edge noise of the rotor blade, which is generated by the fluid, is at least partly cancelled out by the anti-noise signal. A method for creating such rotor blade and a related wind turbine is also provided.

13 Claims, 5 Drawing Sheets

(58) Field of Classification Search
CPC ........... F02D 13/0215; F02D 2041/001; F02D 2041/228; F02D 2200/101; F02D 2200/501
See application file for complete search history.

(56) References Cited

FOREIGN PATENT DOCUMENTS

ES 2327696 A1 11/2009
WO WO 2008043874 A1 4/2006

* cited by examiner

FIG 3
(State of the art)

ROTOR BLADE WITH NOISE REDUCTION

CROSS-REFERENCE TO RELATED APPLICATIONS

This application claims priority to PCT Application No. PCT/EP2020/076991, having a filing date of Sep. 25, 2020, which claims priority to EP Application No. 19204871.8, having a filing date of Oct. 23, 2019, the entire contents both of which are hereby incorporated by reference.

FIELD OF TECHNOLOGY

The following relates to a rotor blade with noise reduction means, especially for a wind turbine. The rotor blade is designed and configured for being exposed to a fluid, e.g., air, wherein flow-induced edge noise of the rotor blade is minimized by the following. The following is furthermore related to a wind turbine with at least one such rotor blade.

BACKGROUND

When a rotor blade with a leading edge and a trailing edge is exposed to a fluid, such as air, flowing substantially from the leading edge to the trailing edge of the rotor blade, noise is typically generated at the edges of the rotor blade, e.g., due to eddies. The intensity of the noise and the frequency of the noise depends on many parameters, such as the properties of the fluid and the properties of the edge, namely the size of the edge and the shape of the edge, e.g., whether it is rounded or sharp.

Trailing edge noise emitted from a wind turbine blade is the dominant noise generation mechanism for modern industrial scale wind turbines. Significant effort and money has been invested in noise reduction technologies, e.g. including serrations currently used on new onshore turbines. The noise from wind turbines often dictates the regions where the machines can be erected, or correspondingly dictates the manner in which the machine can be operated. Often, wind turbines are running in curtailed operational modes, sacrificing power output for noise reduction. Thus, the noise emission of a turbine directly affects negatively its economic viability when these conditions exist.

As this issue is known since several years, various approaches for reducing flow-induced edge noise of a rotor blade have been proposed. These approaches include the shape and the design of the airfoil. In this context, particularly the shape and the design of the trailing edge of the rotor blade is of utmost importance. Aerodynamic add-ons may be added to or included in the rotor blade in order to minimize the flow-induced edge noise of the rotor blade. Well-known add-ons for noise reduction are serrations such as a serrated panel which is mounted to the pressure side or suction side of the rotor blade close to the trailing edge. However, the still existing and the still generated flow-induced edge noise could still be considerable.

Lately, a technology development project has been launched to develop an active noise cancellation system for wind turbine trailing edge noise. Patent application EP 3249216 A1 discloses a system which uses measured unsteady surface pressures on the blade of a wind turbine to feed an anti-noise controller that generates an inverted acoustic signal, negating the trailing edge noise in the far field. However, active solutions are in early stages of development.

SUMMARY

An aspect relates to improve the known systems, devices and methods to facilitate an improvement regarding noise reduction concerning rotor blades (with active means).

A rotor blade according to embodiments of the invention has a leading edge and a trailing edge and is designed and configured for being exposed to a fluid flowing substantially from the leading edge to the trailing edge of the rotor blade. For example, the rotor blade is a rotor blade of a wind turbine. The rotor blade comprises at least three sensors designed for detecting flow characteristics of the fluid and providing respective sensor signals, wherein the sensors are arranged with a non-uniform spacing, and the rotor blade further comprises at least one actuator for producing an anti-noise signal based on a sensor signal. The sensors and the actuator are arranged at the surface of the rotor blade and the actuator is arranged and prepared such that flow-induced edge noise of the rotor blade, which is generated by the fluid, is at least partly cancelled out by the anti-noise signal.

A rotor blade typically comprises a root (connected with the axis of the rotor) and a tip. In action, it moves in a predefined direction, wherein the edge pointing in the direction of moving is the leading edge and the opposite edge is the trailing edge. Since a rotor blade is formed that it produces a pressure difference between its two surfaces, the rotor blade comprises a pressure side and a suction side. The rotor blade is characterized by a span, which is a straight-line projecting away from the root in direction of the tip. and a chord pointing from the leading edge to the trailing edge oriented perpendicular to the span.

The rotor blade comprises at least three sensors, or at least 5, 7 or more sensors, for detecting flow characteristics of the fluid. The sensors produce sensor signals based on the detected flow characteristic. These sensor signals are pressure values or pressure signals, however, they may also (or instead) contain information about the direction and/or velocity of flow.

The arrangement of sensors (and actuators) can be called a group. It is desired that each group of sensors corresponds with the actuator or a plurality of actuators (that are also members of the group). It is desired to arrange groupings of (e.g., spanwise) sensors of approximately 0.5 m-2 m in length, each group corresponding to a actuator or a (e.g. chordwise) distribution of actuators to cancel that section's noise emission. Thus, it is desired that a group of sensors cover at least 0.3 m of the span of a rotor blade, at least 1 m, or at least 2 m. The sections of groups may overlap, however, it is desired that each group covers an individual section, wherein the sections do not overlap.

The at least three sensors are arranged with a non-uniform spacing (at least in lateral direction at the surface). This means that although the sensors may be all arranged in plane with the surface or protruding similarly from or into the surface of the rotor blade, at least the lateral distance of adjacent sensors must not be uniform. The sensors may be arranged chaotically in an area, however it is desired that they are arranged in a line or a number of lines (with non-uniform spacing to adjacent sensors). Also, an embodiment is desired where the sensors are arranged in a grid on the surface of the rotor blade (spanwise and chordwise), what has the advantage that different and/or a broader range of frequencies can be measured. It is especially desired that all distances between adjacent sensors have differing values so that even no periodic arrangements exist.

It should be noted that the reduction or elimination of the noise is achieved by the use of anti-noise. Since flow-induced edge noise is typically a broadband noise source, caused by a turbulent flow, it is random. Thus, the acoustic pressure fluctuations are nondeterministic, meaning that they cannot be predicted in a temporal sense on the basis of the current or earlier acoustic signals, even when the statistical properties are known. According to embodiments of the present invention, the non-uniform spacing of the sensors is used for efficient spatial filtering. Non-uniform spacing avoids redundancy, offering as much information about the source as possible for a given number of sensors.

The actuator on the rotor blade is designed for producing an anti-noise signal. There could be one actuator or two or more actuators for each group of sensors. The signals of two or more sensors are used to create the anti-noise signal of one single actuator, it is also possible that the signal of one single sensor is used to create the output signal of one single actuator (from in this case at least three actuators). Also, signals of sensors are used interleaved in that the signal of one sensor (or a group of sensors) is used to create the output signal of two or more actuators, wherein the output signal of at least one of these actuators is created with the use of the signal of another sensor. Thus, the at least three sensors mentioned above do not need to drive the actuator mentioned above together, however, the anti-noise signal of the actuator is affected by the signal of at least one of these sensors. However, a group of sensors (e.g. the three sensors) are used to generate signals for the actuator (especially a plurality of actuators), wherein the actuator(s) is/are part of the particular group.

The sensors and the actuator are arranged at the surface of the rotor blade. This means that they are somehow integrated or added to the rotor blade at its surface. In order to prevent disadvantageous aerodynamic effects one option is to submerge and insert the sensor and the actuator into the shell or surface part of the rotor blade such that they are in contact with the surrounding air, but they do not stick out and produce additional turbulences on the surface of the rotor blade.

An actuator must be arranged and prepared such that flow-induced edge noise of the rotor blade, which is generated by the fluid, is at least partly cancelled out by the anti-noise signal. Such arrangement is known e.g., by the disclosure of above-mentioned patent application EP 3249216 A1. However, with the non-uniform spacing of the sensors, embodiments of the present invention represent a refinement of the idea of actively canceling noise. As said above, according to embodiments of the invention it is possible that one of the three sensors mentioned above may "drive" the actuator mentioned above (and the other two sensors drive other actuators), it is desirable that the signals of at least two of the sensors together (or three or more sensors) are used to create one single anti-noise signal that is then emitted by at least one actuator. Since the noise may be non-uniform along the trailing edge, every actuator emits an individual anti-noise signal each created from different sensor signals (i.e., signals from different sensors and/or combinations of signals of different groups of sensors).

A method according to embodiments of the invention for constructing a rotor blade (according to embodiments of the invention), comprises the following steps:

Providing a rotor blade with a leading edge and a trailing edge, wherein the rotor blade is designed and configured for being exposed to a fluid flowing substantially from the leading edge to the trailing edge.

Providing at least three sensors designed for detecting flow characteristics of the fluid and providing respective sensor signals and at least one actuator designed for producing an anti-noise signal based on a sensor signal.

Arranging the sensors at the surface of the rotor blade with a non-uniform spacing and arranging the actuator at the surface of the rotor blade, wherein the actuator is arranged and prepared such that flow-induced edge noise of the rotor blade, which is generated by the fluid, is at least partly cancelled out by the anti-noise signal.

A wind turbine according to embodiments of the invention comprises at least one rotor blade according to embodiments of the invention or manufactured with a method according to embodiments of the invention.

It should be noted that the term 'actuator' has to be understood in a broad sense, e.g., as any means which is able to transform an electrical signal or a pressure signal into a physical, mechanical movement. Examples of such an actuator are a membrane or a loudspeaker or a morphing surface of the rotor blade. An 'actuator' could include any means which is suitable and capable for producing the desired anti-noise signal which is subsequently used in order to at least partly cancelling out the flow-induced edge noise.

Likewise, the mentioned 'sensor' also has to be understood in a broad sense as any means which is capable to detect the flow characteristics of the fluid passing by the sensor. The sensor may, for example, also comprise a membrane. It may also comprise some sort of microphone. In the simplest form, the sensor may just be a small opening in the surface which senses the fluctuating surface pressure induced by the fluid, which is passing by the opening, such that this pressure then induces and produces the anti-noise signal.

According to a rotor blade, the sensors are arranged in a spanwise line along the trailing edge of the rotor blade. The inventors found out that a spanwise distribution of sensors (i.e., along the span of the blade) has the advantage that actuators at a single spanwise location could cancel the total noise from an extended spanwise section, rather than a very narrow region characterized by a single sensor. Thus, the use of more than one sensor signal to create the anti-noise signal of one actuator together with the spanwise arrangement of sensors.

According to a rotor blade, a sensor comprises a microphone (e.g., a surface microphone) and an actuator comprises a loudspeaker and is arranged and prepared to emit a sound signal with the loudspeaker. Microphones and loudspeakers are well-known and readily available, inexpensive devices which can be integrated or added to a rotor blade at almost any size in a simple and inexpensive manner, without affecting the aerodynamic flow around the blade.

According to a rotor blade, a sensor comprises a surface pressure transducer and an actuator comprises a membrane and is arranged and prepared to induce at least partial cancellation of unsteady surface pressures with the membrane. Suitable pressure transducers are well-known and well-proven and may be added or implemented and included to a rotor blade without large expenses or changes to that rotor blade.

According to a rotor blade, a sensor is located downstream of the actuator with regard to the flow direction of the fluid, wherein this actuator uses the signal of this sensor for creating its anti-noise signal.

According to a rotor blade, the anti-noise signal of the actuator is based on the sensor signals from at least two of the three sensors, or from three or more sensors. The signals of the sensors are processed and used within a grouping of sensors and actuators, i.e., one grouping of (e.g., spanwise) sensors feeds one grouping of (e.g. chordwise) actuators.

A rotor blade further comprises a control unit for constructing the anti-noise signal, arranged such that the actuator is connected with at least one of the sensors via the control unit.

The sensor outputs from a group of sensors (e.g. unsteady pressure sensors, especially spanwise arranged) are used to generate a real-time prediction of the noise emitted from the respective blade section covered by the sensors. The predicted noise emission is based on physical models relating the unsteady surface pressure on an airfoil to its emitted acoustic noise. The relation between the measured surface pressure and the far-field noise can further be tuned based on experimentation and can also depend on e.g., the trailing edge geometry or the presence of serrations. As the emission from the blade section is a function of an observer's location relative to the blade section, i.e., the emission directivity—the anti-noise signals passed to chordwise distributed actuators, e.g. speakers—must also reflect this observer location dependence. In order to most effectively cancel the noise at a broad range of observer locations, the anti-noise generation algorithm should reflect the trailing edge noise directivity and will likely be based on a control strategy that minimizes the summed mean-squared noise levels at a distribution of observer locations relative to the blade section.

According to a rotor blade, a number of sensors (of a group) is located at the suction side and a number of sensors is located at the pressure side. The actuators using the sensor signals of this group of sensors are located at the pressure side and the suction side, however, actuators may also be arranged on one of these sides, only.

On the other hand, an embodiment is provided where sensors are arranged only on one single side of the rotor blade, the suction side, and actuators are arranged on both sides of the rotor blade. Regarding this embodiment it should be noted that the turbulence from a single side radiates noise in both directions, where the turbulence from the suction side is typically more important. Thus, it is possible to only measure the turbulence on the suction side but cancel its associated noise in both directions (to the pressure side and the suction side.

According to a rotor blade, the actuator and/or a control unit is connected with at least one of the sensors via connection means, wherein the connection means are designed to guide an electric signal or a pressure signal. In the case that the connection means are designed to guide an electric signal, they are wires. If the connection means are designed to guide pressure, they are designed as flexible tubes or channels.

According to a rotor blade, the sensors are arranged with a quadratic, exponential, chaotic or logarithmic spacing, or that the sensors are arranged in an alternating non-linear way such that along the arrangement of sensors there are alternating long and short spacings, wherein the spacings are non-periodical. A spacing is logarithmic or exponential along a (e.g. spanwise) line, in particular a spacing described by $x=\text{sgn}(-1^n) \cdot A \cdot e^{(B \cdot n)}$, where n is the sensor number, A and B are constants and x is a coordinate in the spanwise direction. The sensors are arranged in two or more lines of sensors, especially each line with their own functional form (sensor distribution). In another embodiment it is desirable that sensors are arranged along a y coordinate perpendicular to the above x coordinate (i.e. chordwise) in a distribution $y=f(x,n)$ on the blade surface.

In an embodiment of the invention, the rotor blade comprises a portion which has the shape of an airfoil comprising a pressure side and a suction side, and the pressure side and the suction side are each confined by the trailing edge and the leading edge of the rotor blade. In other words, the rotor blade is a lift producing rotor blade which has at least partly the shape of an airfoil. An airfoil is characterized in that it comprises a pressure side and a suction side and is able to produce lift when it is exposed to a fluid flowing substantially from the leading edge to the trailing edge of the rotor blade. As it is well-known to the person skilled in the art, the outer surface of such an airfoil shaped rotor blade is characterized by one portion which is referred to as the pressure side and which is confined at one side by the trailing edge and on the other side by the leading edge and the remaining part of the surface is typically referred to as the suction side of the rotor blade.

The rotor blade is designed to be used for a wind turbine. However, the inventive concept is not limited to flow-induced edge noise of rotor blades of a wind turbine. It can also be applied to reduce flow-induced edge noise from, for example, aircraft wings, helicopter blades, fans, etc.

The advantage of the special non-uniform distribution of sensors according to embodiments of the invention, especially along the spanwise direction, would render the performance of the rotor blade more efficient. The non-uniform distribution avoids redundant spacing, and thus mitigates a special aliasing issue. In other words, only a particular component of the turbulence spectrum (here especially the wavenumber spectrum should be considered) radiates as acoustic noise, and a non-uniform distribution more effectively filters for that component.

The consideration of the wavenumber spectrum enhances the understanding of this issue. Just like a time signal can be transformed into the frequency domain, a spatial distribution here can be transformed into the wavenumber domain. The trailing edge noise theory says that a specific frequency of far field noise can be attributed to a specific wavenumber component of the surface pressure wavenumber spectrum. Thus, any distribution of microphones is effectively a spatial filter for that wavenumber component. The special non-uniform spacing renders this filter very efficient. Thus, the most benefit in the non-uniform distribution of sensors is the ability to act as a wavenumber or spatial filter (and has not necessarily to act as any kind of frequency filter).

The presently proposed embodiment of this invention uses a non-uniform distribution of unsteady surface pressure sensors (e.g., surface microphones) in order to efficiently filter the boundary layer turbulent spectral content for the component that radiates as acoustic noise. This reduces the number of surface microphones required and thus reduces the cost of the anti-noise system.

It should be noted that the flow-induced edge noise, which is at least partly cancelled out by the anti-noise signal being produced by the actuator relates to trailing edge noise of the rotor blade, i.e. to noise which is flow-induced edge noise and which is generated in the trailing edge of the rotor blade. However, in principle, embodiments of the present invention may be applied to other flow-induced edge noise sources as well, such as, for instance, leading edge in-flow turbulence noise or tip noise of the rotor blade.

BRIEF DESCRIPTION

Some of the embodiments will be described in detail, with reference to the following figures, wherein like designations denote like members, wherein.

DETAILED DESCRIPTION

Figure 1:
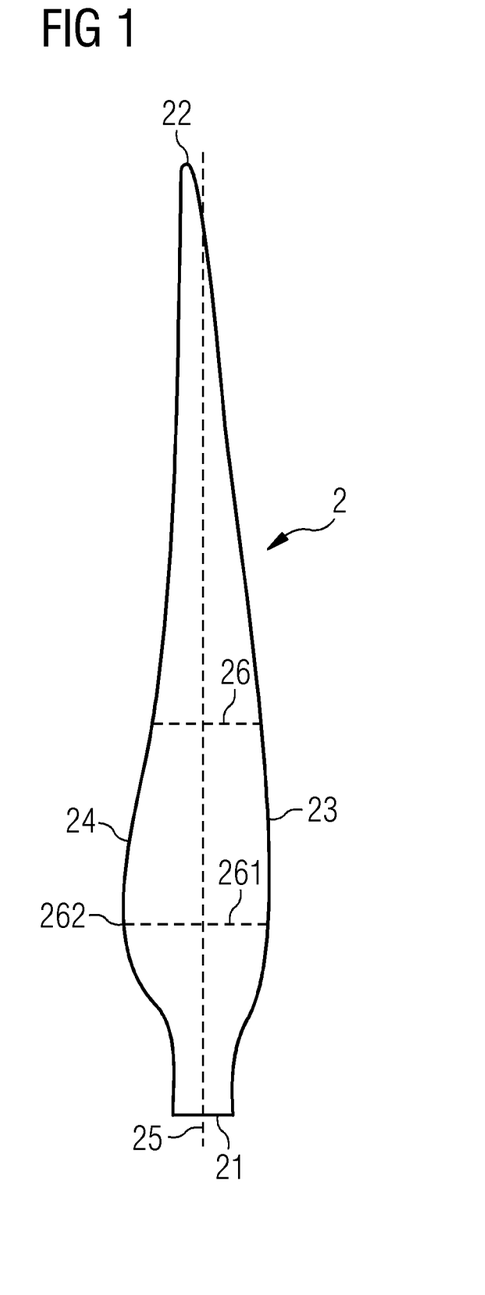
FIG. 1 shows a typical rotor blade.

FIG. 1 shows a rotor blade 2. The rotor blade 2 comprises a root 21 and a tip 22 as well as a leading edge 23 and a trailing edge 24. The figure illustrates a top view or planar view onto the rotor blade 2, namely onto the pressure side of the rotor blade. The rotor blade 2 is characterized by a span 25, which is a straight-line projecting away from the root 21. In the case of a rotor blade 2 of a wind turbine 1 (see e.g., FIG. 6), wherein the rotor blade 2 is pitchable about a pitch axis.

Furthermore, a plurality of chords 26 may be assigned to the rotor blade 2. Each chord 26 is oriented perpendicular to the span 25. Therefore, for each spanwise position starting at the root 21 in direction of the tip 22, a chord 26 may be defined. The chord 26 which is maximum (i.e., which has a maximum length or extension), is referred to as the maximum chord 261. The area where the maximum chord 261 is located is referred to as the shoulder 262 of the rotor blade 2.

If the rotor blade 2 moves in a fluid, e.g., air, the unsteady surface pressure pattern, that generates the sound at the edge, can be considered to convect unchanged with the flow along the chord 26 of the rotor blade 2. Note that in practice this unchanged convection happens until a certain degree. This means that minimum changes of the unsteady surface pressure pattern are possible. This phenomenon is referred to in the literature as the 'frozen turbulence' assumption. In embodiments of the present invention, this fact is used to detect the unsteady surface pressures upstream of the edge so that a noise cancelling anti-noise signal can be constructed and emitted in anti-phase at the moment when the turbulent eddies, which are responsible for the unsteady surface pressure pattern and noise generation, pass the edge.

Figure 2:
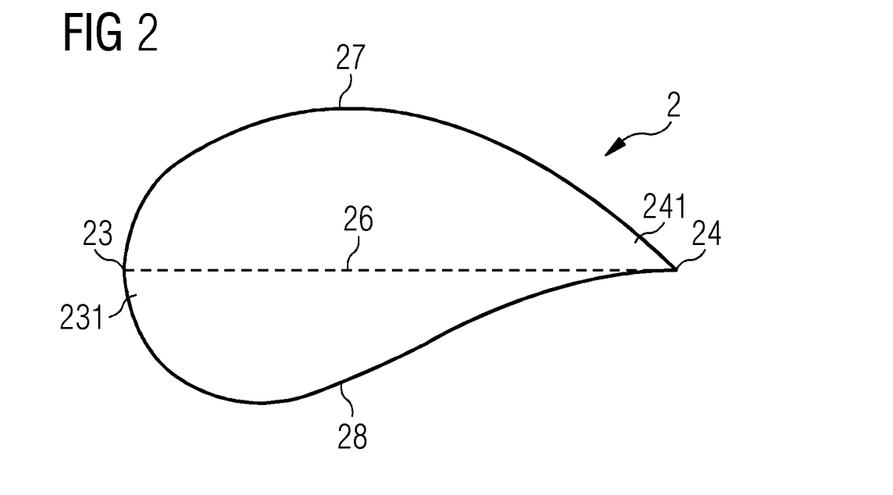
FIG. 2 shows a profile of the rotor blade at a certain spanwise position.

FIG. 2 shows a schematic view of an airfoil of the rotor blade 2. This airfoil or profile is taken perpendicular to the span 25 of the rotor blade 2. In other words, this profile is a cross-sectional view at a specific radial position or spanwise position of the rotor blade 2. The leading edge 23 can be seen and described as a relatively round edge, whereby the trailing edge 24 is relatively sharply designed. The straight line connecting the leading edge 23 with the trailing edge 24 is referred to as the chord 26.

Note that the whole area from the leading edge 23 up to ten percent of the chord length of the chord 26 as measured from the leading edge 23 is referred to as the leading-edge section 231. Likewise, the area which is within ten percent chord wise length away from the trailing edge 24 is referred to as the trailing edge section 241.

Note that in this schematic view the maximum thickness of the airfoil which is defined as the distance between the pressure side 28 of the suction side 27 is relatively large. This thickness often times considerably decreases towards the tip 22 of the rotor blade, at least in modern rotor blades 2 of wind turbines 1.

Figure 3:
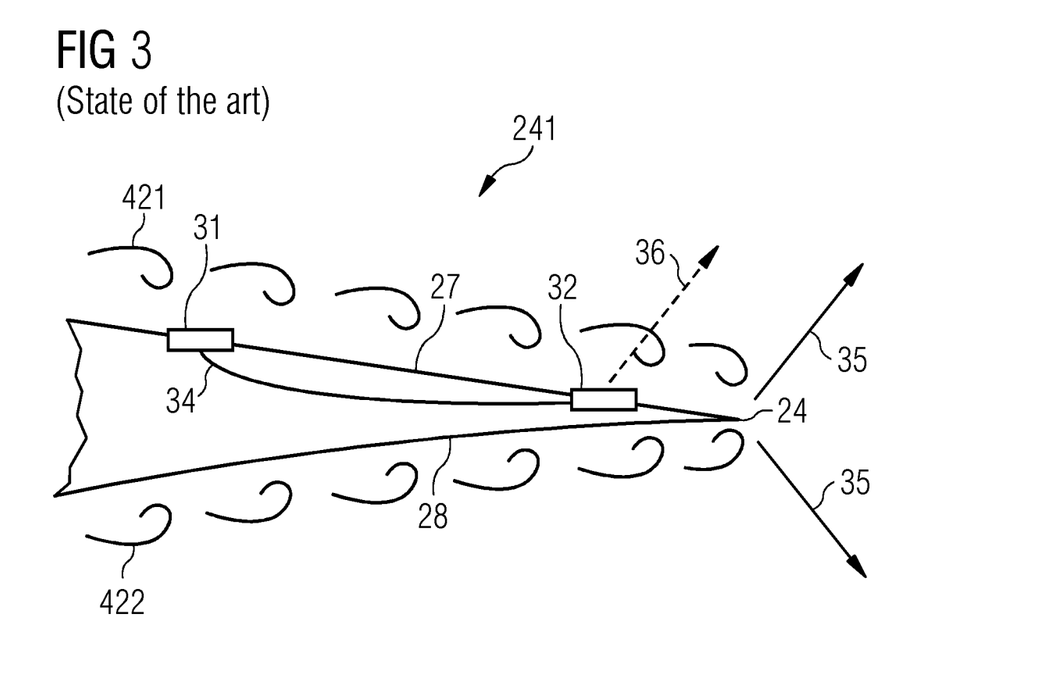
FIG. 3 shows an embodiment of the state of the art comprising a sensor and an actuator, which are directly connected via connection means.

FIG. 3 shows a trailing edge section 241 according to the state of the art, comprising a sensor 31, one sensor 31 being positioned at the suction side 27 of the rotor blade 2 and directly connected with an actuator 32. The sensor 31 is located upstream with regard to the actuator 32 which is arranged and positioned at the suction side 27 of the rotor blade 2.

The sensor 31 is connected with the actuator 32 via connection means 34. The actuator 32 is configured to produce the anti-noise signal 36 based on the input which is received by the sensor 31. The anti-noise signal 36 which is emitted by the actuator 32 is symbolized by the dashed arrow.

The anti-noise signal 36 is deliberately chosen such that it destructively interferes with the noise 35 which is generated and emitted at the trailing edge 24 of the rotor blade 2. Note that here two main directions of the noise 35 are visualized by the two arrows, one projecting away from the trailing edge 24 into the direction of the suction side 27, and one projecting away from the trailing edge 24 into the direction of the pressure side 28. In the exemplary embodiment of the figure, the anti-noise signal 36 mainly cancels out or minimizes the noise 35 which is emitted and generated at the trailing edge 24 into the direction of the suction side 27. If desired, a pressure-side actuator 32 (not shown) could be added to also eliminate the noise 35 emitted to the pressure side 28. Also note the turbulent boundary layer which is symbolized by suction side eddies 421 and pressure side eddies 422. The overall flow direction of the fluid is symbolized by reference sign 41.

Figure 4:
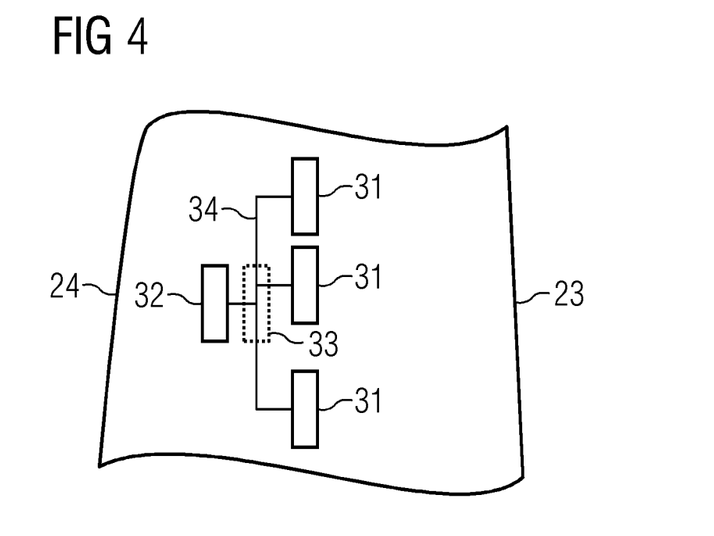
FIG. 4 shows an embodiment of the invention comprising a number of sensors and an actuator, which are directly connected via connection means.

FIG. 4 shows an embodiment of the invention comprising a number of sensors 31 and an actuator 32, which are directly connected via connection means 34. The sensors 31 and the actuator 32 are arranged at the surface of the rotor blade 2.

The rotor blade 2 has a leading edge 23 and a trailing edge 24 and is designed and configured for being exposed to a fluid flowing substantially from the leading edge 23 to the trailing edge 24.

The rotor blade 2 comprises here three sensors 31 designed for detecting flow characteristics of the fluid and providing respective sensor signals. The sensors 31 are arranged in spanwise direction with a non-uniform spacing.

The rotor blade 2 comprises here one actuator 32 for producing an anti-noise signal 36 (see e.g., FIG. 3) based on a sensor signal of all three sensors 31. The actuator 32 is connected with the sensors 31 via connection means 34. Optionally there could be a control unit 33 (dashed) between the sensors 31 and the actuator 32 to create the anti-noise signal from the sensor signals. The actuator 32 is arranged and prepared such that flow-induced edge noise 35 of the rotor blade 2, which is generated by the fluid, is at least partly cancelled out by the anti-noise signal 36.

Figure 5:
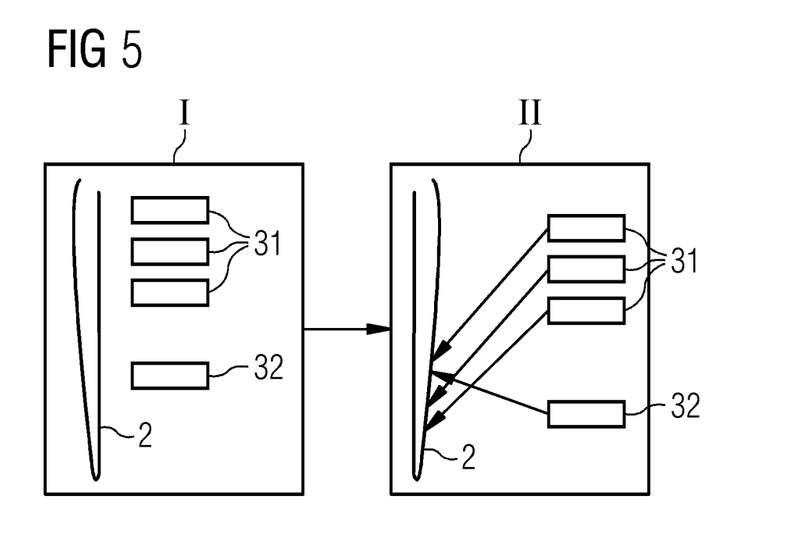
FIG. 5 shows a block diagram of the process flow of a method according to an embodiment of the invention.

FIG. 5 shows a block diagram of the process flow of a method according to embodiments of the invention.

In step I, a rotor blade 2 (see e.g., FIG. 1), three sensors 31 and an actuator 32 are provided. As said above, the sensors 31 are designed for detecting flow characteristics of the fluid and providing respective sensor signals and the actuator 32 is designed for producing an anti-noise signal 36 based on a sensor signal.

In Step II, the sensors 31 are arranged at the surface of the rotor blade 2 with a non-uniform spacing (see arrows), the actuator 32 is arranged at the surface of the rotor blade 2 (see arrow), wherein the actuator 32 is arranged and prepared such that flow-induced edge noise 35 of the rotor blade 2, which is generated by the fluid, is at least partly cancelled out by the anti-noise signal 36.

Figure 6:
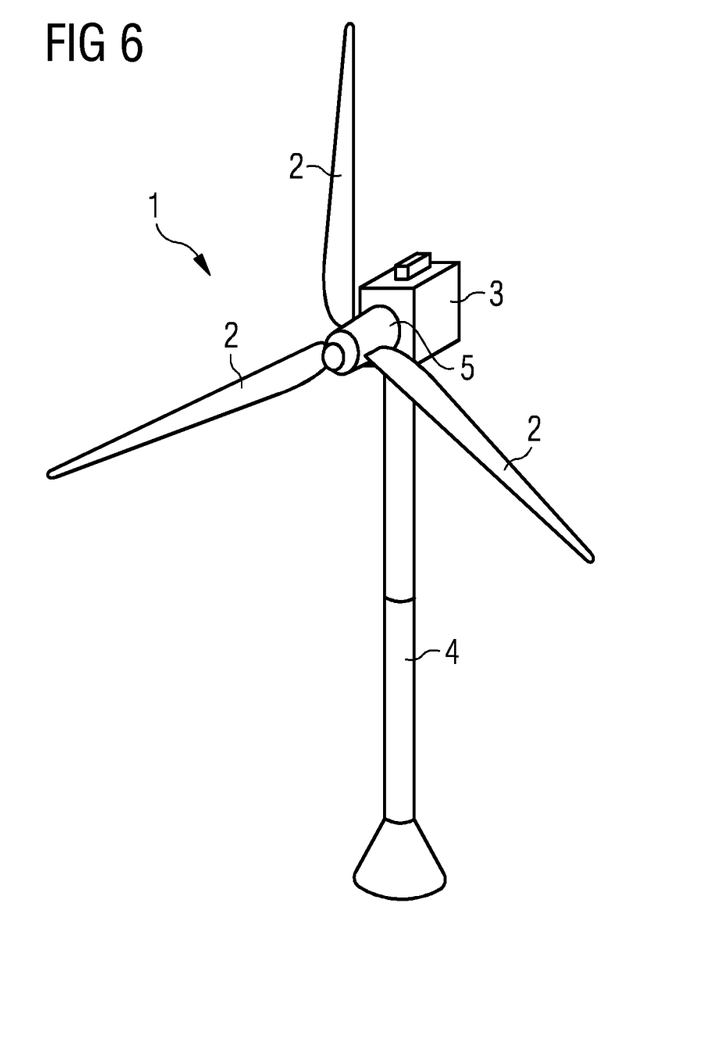
FIG. 6 shows an embodiment of a wind turbine according to the invention.

FIG. 6 depicts a wind turbine 1 according to embodiments of the invention having three rotor blades 2 with sensor configurations in accordance with embodiments of the present invention (see e.g., FIG. 4). The rotor blades 2 connect to a hub 5 of the wind turbine 1. The hub 5 is connected to a nacelle 3 that is atop a wind turbine tower 4.

Figure 7:
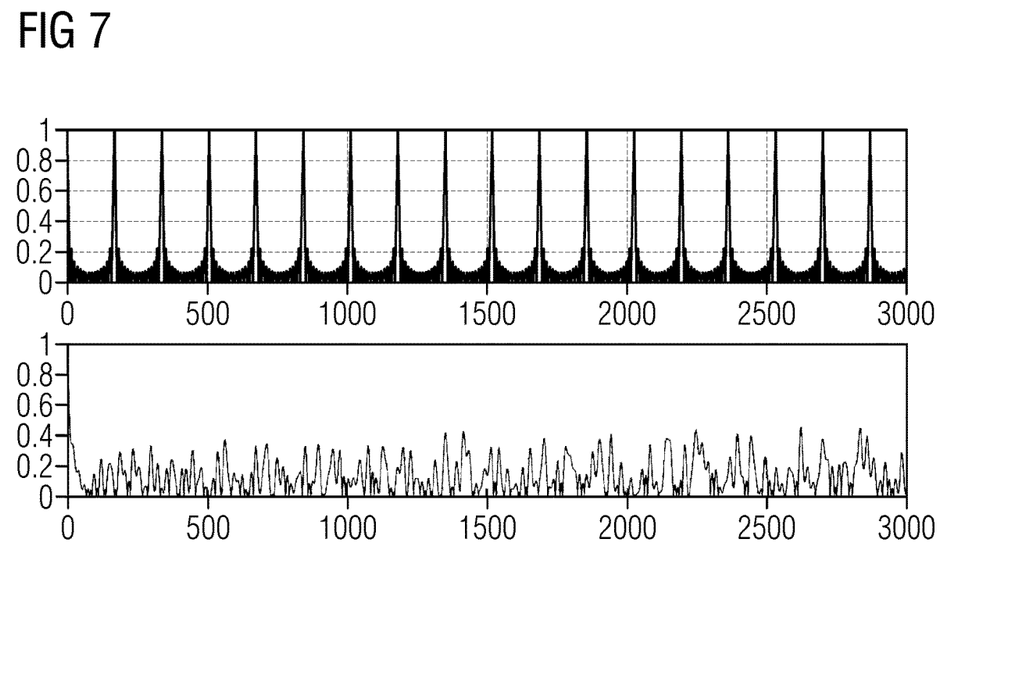
FIG. 7 shows simulation results for a uniform sensor spacing versus a logarithmically spaced sensor distribution.

FIG. 7 shows simulation results for a uniform sensor spacing versus a logarithmically spaced sensor distribution. The quantity plotted is the root-mean-square of the summed sensor signals for each sensor configuration when the simulated sensors are fed various spatial frequencies. The issue with the uniform spacing is clearly shown, where the sensor network is unable to distinguish between the desired component which efficiently radiated noise and a component that doesn't efficiently radiate noise. The logarithmic sensor spacing suppresses this aliasing.

Figure 8:
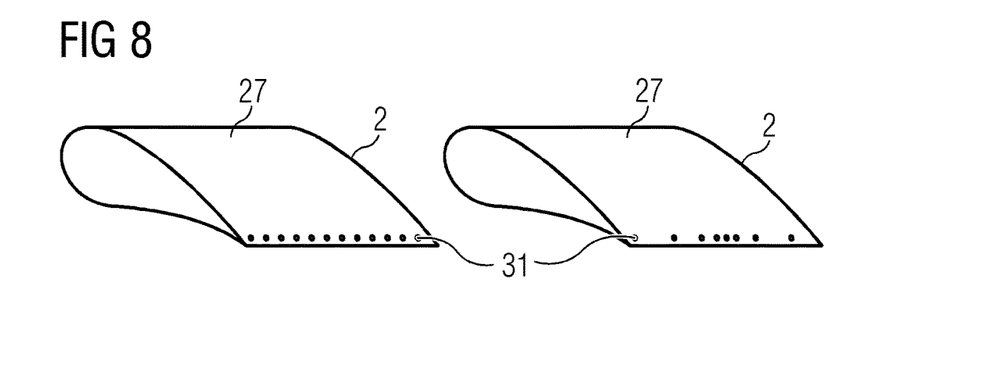
FIG. 8 shows an example for a non-uniform sensor arrangement.

FIG. 8 shows an example for a non-uniform arrangement of sensors 31 (right) in contrast to a uniform arrangement of sensors 31 (left) on the suction side 27 a rotor blade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "device" does not preclude the use of more than one unit or device.

The invention claimed is:

1. A rotor blade with a leading edge and a trailing edge, wherein
   the rotor blade is designed and configured for being exposed to a fluid flowing substantially from the leading edge to the trailing edge,
   the rotor blade comprises at least three sensors designed for detecting flow characteristics of the fluid and providing respective sensor signals, wherein the sensors are arranged in a line with a non-uniform spacing between adjacent sensors, and
   the rotor blade further comprises at least one actuator for producing an anti-noise signal based on a sensor signal,
   the sensors and the actuator are arranged at the surface of the rotor blade, and
   the actuator is arranged and prepared such that flow-induced edge noise of the rotor blade, which is generated by the fluid, is at least partly cancelled out by the anti-noise signal.

2. The rotor blade according to claim 1, wherein the sensors are arranged in a spanwise line along the trailing edge.

3. The rotor blade according to claim 1, wherein a sensor comprises a microphone and an actuator comprises a loudspeaker and is arranged and prepared to emit a sound signal with the loudspeaker.

4. The rotor blade according to claim 1, wherein a sensor comprises a surface pressure transducer and an actuator comprises a membrane and is arranged and prepared to induce at least partial cancellation of unsteady surface pressures with the membrane.

5. The rotor blade according to claim 1, wherein a sensor is located downstream of the actuator with regard to the flow direction of the fluid, wherein the actuator uses the signal of this sensor for creating its anti-noise signal.

6. The rotor blade according to claim 1, wherein the anti-noise signal of the actuator is based on the sensor signals from at least two of the three sensors, or from three or more sensors.

7. The rotor blade according to claim 1, further comprising a control unit for constructing the anti-noise signal, arranged such that the actuator is connected with at least one of the sensors via the control unit.

8. The rotor blade according to claim 1, wherein a number of sensors is located at the suction side and the actuator using the sensor signals of this number of sensors is located at the pressure side or vice versa.

9. The rotor blade according to claim 1, wherein the actuator and/or a control unit is connected with at least one of the sensors via a connection, wherein the connection is designed to guide an electric signal or a pressure signal, wherein the connection is wires or designed as flexible tubes or channels.

10. The rotor blade according to claim 1, wherein the sensors are arranged with a quadratic, exponential, chaotic or logarithmic spacing, or that the sensors are arranged in an alternating non-linear way such that along the arrangement of sensors there are alternating long and short spacings, wherein the spacings are non-periodical.

11. The rotor blade according to claim 1, comprising a portion which has the shape of an airfoil, wherein the rotor blade is designed to be used for a wind turbine.

12. A method for constructing a rotor blade comprising the steps:
   providing a rotor blade with a leading edge and a trailing edge, wherein the rotor blade is designed and configured for being exposed to a fluid flowing substantially from the leading edge to the trailing edge,
   providing at least three sensors designed for detecting flow characteristics of the fluid and providing respective sensor signals and at least one actuator designed for producing an anti-noise signal based on a sensor signal,
   arranging the sensors at the surface of the rotor blade in a line with a non-uniform spacing between adjacent sensors, and
   arranging the actuator at the surface of the rotor blade, wherein the actuator is arranged and prepared such that flow-induced edge noise of the rotor blade, which is generated by the fluid, is at least partly cancelled out by the anti-noise signal.

13. A wind turbine comprising at least one rotor blade according to claim 1 or manufactured with a method comprising the steps:
   providing a rotor blade with a leading edge and a trailing edge, wherein the rotor blade is designed and configured for being exposed to a fluid flowing substantially from the leading edge to the trailing edge,
   providing at least three sensors designed for detecting flow characteristics of the fluid and providing respective sensor signals and at least one actuator designed for producing an anti-noise signal based on a sensor signal,
   arranging the sensors at the surface of the rotor blade in a line with a non-uniform spacing between adjacent sensors, and
   arranging the actuator at the surface of the rotor blade, wherein the actuator is arranged and prepared such that flow-induced edge noise of the rotor blade, which is generated by the fluid, is at least partly cancelled out by the anti-noise signal.

\* \* \* \* \*